US005646786A

United States Patent [19]
Kurtz et al.

[11] Patent Number: 5,646,786
[45] Date of Patent: Jul. 8, 1997

[54] BEAMSPLITTER FOR LASER MULTI-BEAM PRINTERS AND RECORDERS

[75] Inventors: Andrew F. Kurtz, Rochester; John R. Debesis, Penfield; Sanwal P. Sarraf, Pittsford, all of N.Y.

[73] Assignee: Eastman Kodak Company, Rochester, N.Y.

[21] Appl. No.: 427,523

[22] Filed: Mar. 24, 1995

[51] Int. Cl.$^6$ .................................................. G02B 27/14
[52] U.S. Cl. ........................................ 359/637; 359/639
[58] Field of Search ...................................... 359/636, 637, 359/639

[56] References Cited

U.S. PATENT DOCUMENTS

| | | | |
|---|---|---|---|
| 4,960,320 | 10/1990 | Taniura | 359/636 |
| 5,155,623 | 10/1992 | Miller et al. | 359/495 |
| 5,262,888 | 11/1993 | Morishita et al. | 359/245 |
| 5,307,359 | 4/1994 | Sarraf | 372/21 |

FOREIGN PATENT DOCUMENTS 0635745  1/1995  European Pat. Off. ........ G02B 27/14

OTHER PUBLICATIONS

"Development Of High Speed Shutter Array Using PLZT Ceramics And Application For A Photoprinter", I. Saitoh et al.; Minolta Camera Co., Ltd.; from Proc. Ninth International Congress on Advances in Non-Impact Printing Technologies / Japan Hardcopy 1993; pp. 226–229.

"High–Speed Light Modulator Arrays", Aura Ceramics; Oct. 1994; pp. 1–3.

*Primary Examiner*—Georgia Y. Epps
*Assistant Examiner*—Thomas Robbins
*Attorney, Agent, or Firm*—Nelson A. Blish

[57] ABSTRACT

An optical system for illuminating a multi-element spatial light modulator from a multi-emitter laser array such that each element of the modulator sees light from all emitters targets the light onto the two or more rows of elements, without putting light into the gap between the rows, and without putting light in the spaces between the elements. The element illumination may match a complex shape of the elements. A beamsplitter/staggerer is adapted to split the line of laser light into plural parallel lines of light, and to split the parallel lines of light into regions such that substantially all of the light from the illumination system falls onto the elements of the rows without impinging between the rows of elements or between the elements in the rows.

9 Claims, 8 Drawing Sheets

BEAMSPLITTER FOR LASER MULTI-BEAM PRINTERS AND RECORDERS

CROSS-REFERENCE TO RELATED APPLICATIONS

Cross-reference is made to commonly assigned co-pending U.S. patent applications Ser. No. 08/261,370, filed in the name of S. Sarraf on Jun. 16, 1994, and Ser. No. 08/283,003, filed in the names of D. Kessler et al. on Jul. 29, 1994.

BACKGROUND OF THE INVENTION

1. Technical Field

This invention relates generally to laser printers and recorders, and more particularly to laser multi-beam printers and recorders.

2. Background Art

In a typical laser printer, modulated radiation from a laser is imaged onto a receiver to produce a desired spot size. The spot is scanned in line and page directions to create a two-dimensional image.

For higher throughput, many discrete lasers are ganged together to form multiple spots on the receiver, and multiple pixels are written simultaneously. The cost of discrete lasers and the loss of efficiency in coupling to fibers has prompted the use of a monolithic array of individually modulated laser elements to produce multiple spots. However, need to individually modulate each element at high speeds greatly complicates fabrication. The current driver electronics is expensive, high power capacity of each element makes it more susceptible to thermal and electrical cross-talks, and the failure of even one element in the array makes the array useless.

Commonly assigned co-pending U.S. patent application Ser. No. 08/261,370, filed in the name of S. Sarraf on Jun. 16, 1994, describes a light modulator having a row of elements that are uniformly illuminated by light from a multi-emitter laser array. The elements of the modulator break up the light beam, and each element of the modulator is subsequently imaged on the receiver to form desired size spots. The image pixel information comes from the modulator, not the laser.

An optical system suitable for use to illuminate the modulator using direct laser modulation is described in commonly assigned co-pending U.S. patent application Ser. No. 08/283,003, filed in the names of D. Kessler et al. on Jul. 29, 1994. This optical system is not suitable for use with a spatial light modulator.

FIG. 1a illustrates the pattern of a commercially-available PLZT shutter array modulator manufactured by Minolta. This array has a structure which consists of two parallel rows of active elements. Within a row, these elements are not in immediate contact, but are spaced apart from each other by the width of the elements. This provides a 50% "fill factor." The second row of elements is displaced from the first, and is staggered, such that the elements in the second row are 90 degrees out of phase with the elements in the first row. Finally, the elements are not a simple shape (as in square or rectangular), but are parallelograms. The layout of this Minolta modulator is illustrated in FIG. 1a, with actual dimensions of the various features, including the 190 μm offset between the two rows of elements.

Generally, a modulator design with a high fill factor (90–100%) is preferred so as to minimize the light loss between elements. Various modulator technologies are under development that can have rather high fill factors, such as the deformable mirrors devices developed by Texas Instruments. However, few of these modulator technologies have yet demonstrated other highly desired performance characteristics such as modulator speeds in excess of 200 kHz per element, and the ability to handle high power densities (10 kW/cm$^2$). PLZT modulators have demonstrated these abilities successfully, but they have trouble attaining the required high fill factors as well. The Minolta array of FIG. 1a, when combined with the optical system according to the present invention, attains an effective 100% fill factor.

Modulators with similar patterns may become available. FIG. 1b shows a modulator pattern consisting of two parallel rows of elements, where the elements have a simpler rectangular shape, and the two rows of elements are in phase with each other. Such a device has been proposed by Aura Ceramics. FIG. 1c. illustrates a device with square elements, as in FIG. 1b, but with the phase difference of FIG. 1a.

A modulator such as the device of FIG. 1a. presents particularly troublesome problems to the optical design of a laser thermal printer. Two offset rows of elements with a complex shape and a 90 degree phase difference is contrary to the natural inclination of illumination systems that create a single long narrow line of light. While one could illuminate this modulator by flooding the entire area occupied by the two rows of elements, and the gap between them, that would cause an unacceptable loss of light. More optimally, the illumination could be split into two parallel and continuous lines of light, offset by the appropriate gap. However, this too would represent an unacceptable loss of the light that falls between the elements.

DISCLOSURE OF THE INVENTION

It is an object of the present invention to provide an optical system for illuminating spatial light modulators.

According to a feature of the present invention, optical elements between a multi-emitter laser array and a multi-element spatial light modulator modify the light in several ways to make the light optimal for illuminating a spatial light modulator. In particular, light from each emitter is magnified to extend over the full length of the modulator. Thus, each element of the modulator sees light from all emitters, which provides redundancy so that the system is desensitized to the failure of any given emitter. Additionally, as light from all emitters is mixed together, the illumination of the modulator is made more uniform because the spatial light variations within a given emitter, and the power variations from emitter to emitter, are averaged out. The optical elements according to the present invention provide a long narrow line of illumination, which is appropriate for illuminating a linear spatial light modulator consisting of a row of elements spaced closely together.

An illumination method is provided that targets the light onto the two or more rows of elements, without putting light into the gap between the rows, and without putting light in the spaces between the elements. Preferably, the element illumination matches the complex shape of the elements. The illumination induces minimal angular tilt (nominal normal incidence to the modulator in both rows) to preserve the per-element-Lagrange, and exhibits minimal grating dispersion effects to preserve the per-element-Lagrange and minimize the light loss from "scatter" between the elements.

According to a feature of the present invention, a beamsplitter/staggerer is adapted to split the line of laser light into plural parallel lines of light, and to split the parallel lines of light into regions such that substantially all of the light from the illumination system falls onto the elements of the rows without impinging between the rows of elements or between the elements in the rows.

According to another feature of the present invention, the beamsplitter/staggerer may comprise an alternating array of light-transmissive plates and spaces between the plates, the plates being tilted relative to the incident angle of the light such that light passing through the tilted plates is displaced by refraction relative to light passing through the spaces between the plates.

According to another feature of the present invention, the beamsplitter/staggerer may comprise a blazed grating for splitting and imaging the light onto the modulator elements.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2b is a schematic illustration of a beamsplitter/staggerer usable in the optics of FIG. 2a;

FIG. 4 shows another embodiment of a beamsplitter/staggerer usable in the optics of FIG. 2a;

FIG. 5 shows still another embodiment of a beamsplitter/staggerer usable in the optics of FIG. 2a;

FIG. 7 shows yet another embodiment of a beamsplitter/staggerer usable in the optics of FIG. 2a;

FIG. 8 shows yet another embodiment of a beamsplitter/staggerer usable in the optics of FIG. 2a;

FIGS. 9a and 9b show yet another two embodiments of a beamsplitter/staggerer usable in the optics of FIG. 2a; and FIG. 10 shows yet another embodiment of a beamsplitter/staggerer usable in the optics of FIG. 2a.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figures 1B, 1C:
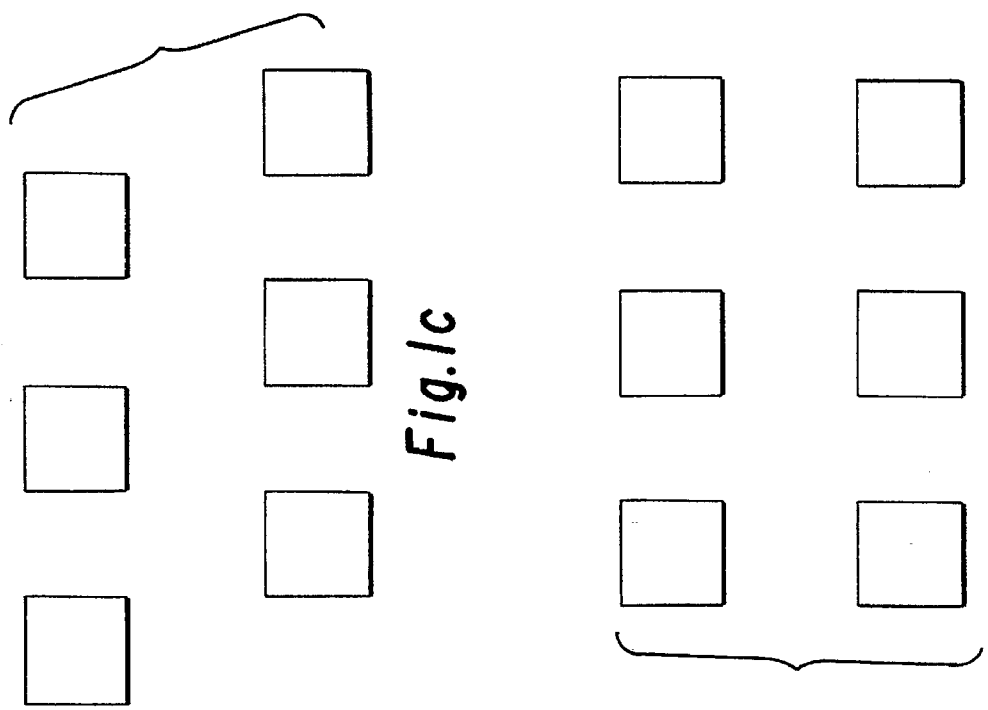
FIG. 1b shows another modulator's element pattern.
FIG. 1c shows yet another modulator's element pattern.
Figure 2A:
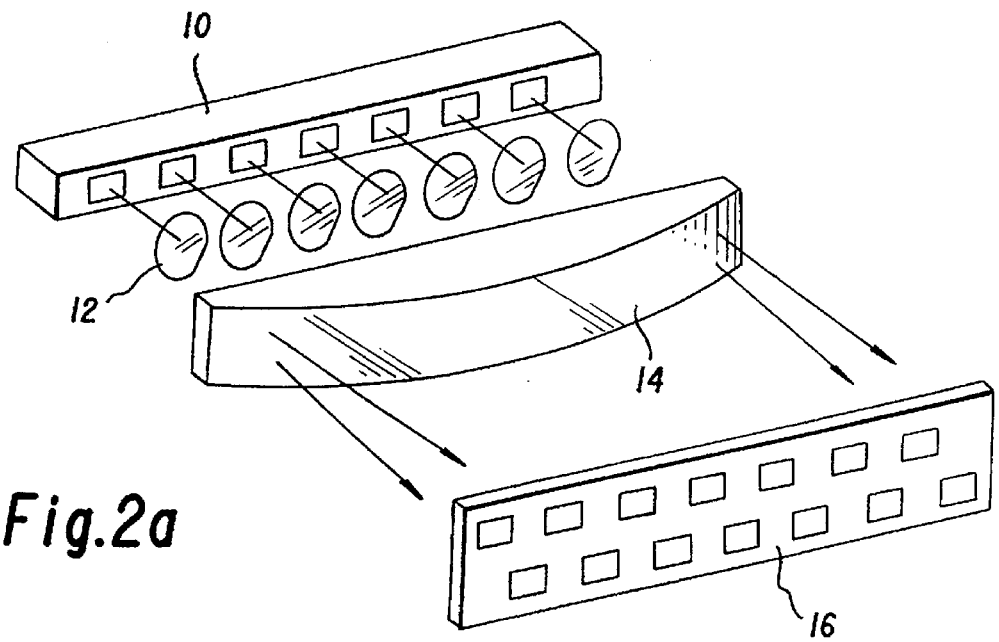
FIG. 2a schematically illustrates the modulator illumination optics of a preferred embodiment of the present invention.

FIG. 2a schematically illustrates the modulator illumination optics of a preferred embodiment of the present invention. light from a laser array 10 is passed by a lenslet array 12 (either refractive or diffractive) and condensing optics 14 to a modulator 16 having a pattern of elements as shown in FIG. 1c. Not illustrated in FIG. 2a, but part of the present invention, is beamsplitting/staggering means just before modulator 16. The illumination system should overlap the images of the magnified emitters of laser array 10 onto each other at modulator 16. This means that beamsplitter/staggerer should be in close proximity to the modulator, rather than near the laser array, so as to redirect the already-mixed light. Alternatively, the laser emitters can be imaged onto the beamsplitter/staggerer, which in turn, is imaged onto modulator 16.

Figure 2B:
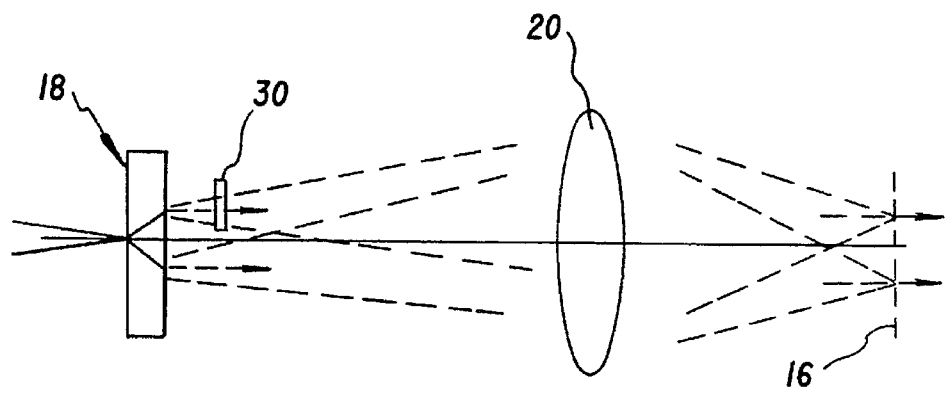

FIG. 2b shows a beamsplitter/staggerer 18 which may be positioned between condenser optics 14 and modulator 16 of FIG. 2a. Beamsplitter/staggerer 18 is imaged onto modulator 16 by a lens 20, although a proximity method could be used without lens 20. The proximity method would be more desirable, because fewer components are used. It will be understood that, for printing applications, a photo-sensitive medium would be positioned beyond modulator 16.

Figure 3:
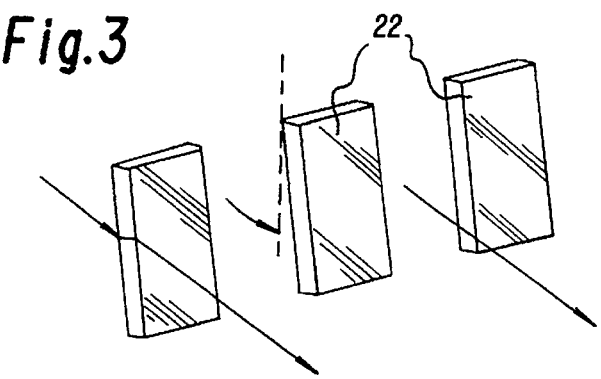
FIG. 3 is a detail view of a portion of the beamsplitter/staggerer of FIG. 2b.

Beamsplitter/staggerer of FIG. 3 is light transmissive, and includes an alternating array of thin tilted glass plates 22 and spaces therebetween. Light passing through the tilted plates is displaced vertically by refraction at the two air/glass surfaces. For example, a 2 mm piece of glass with a refractive index of 1.5 would provide a 190 μm offset with just 0.5 degrees of tilt. It should be noted that this device may not be practical for all systems, given the small size (63.5 μm wide) of the glass plates.

Figure 4:
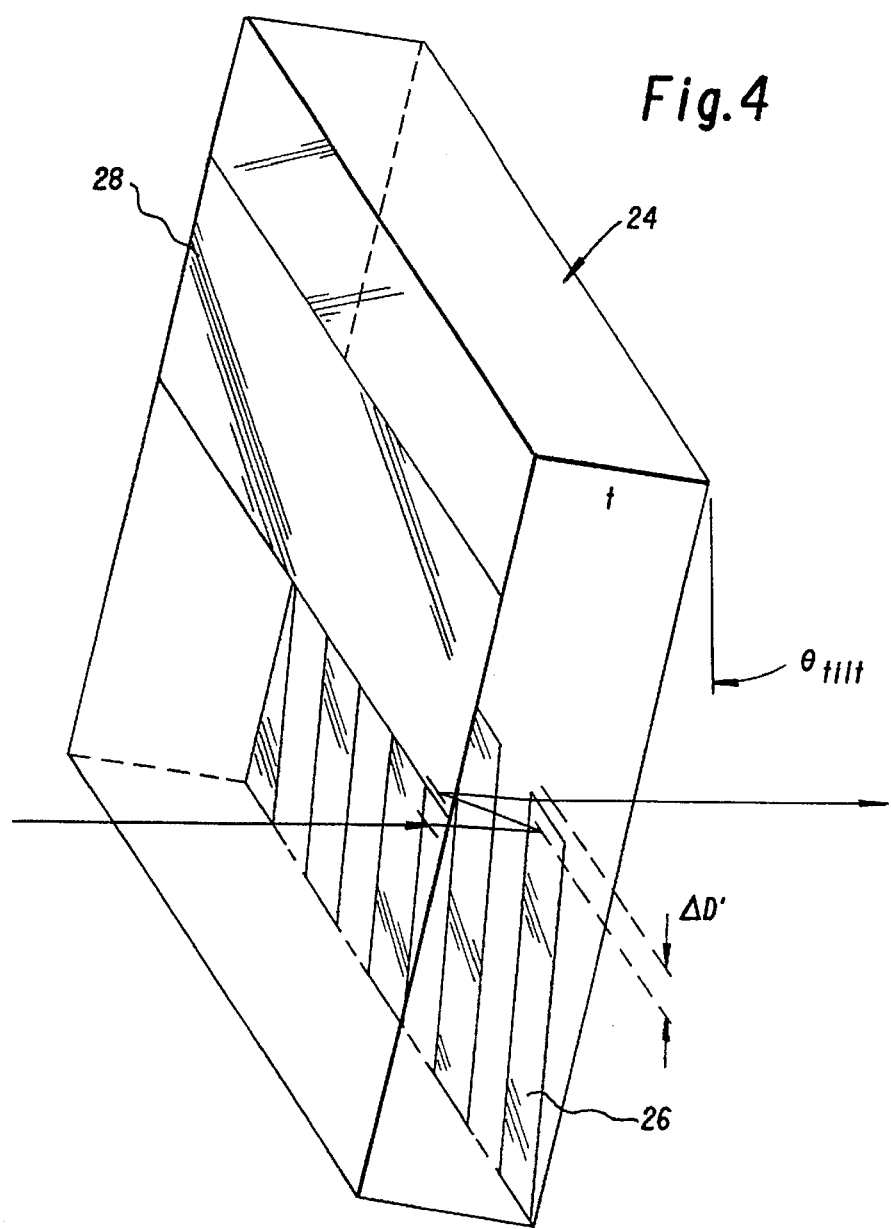

A perhaps more practical "in-line" transmissive beamsplitter/staggerer 24 is shown in FIG. 4. This device is essentially a coarse grating of high reflectivity mirror bars 26 patterned onto a tilted parallel plate. Light is directed onto this device at a modest incident tilt angle $\theta_{tilt}$. The light which then hits the spaces between mirror bars 26 on the second surface will refract outwards, parallel to but displaced from the input direction. This light will then proceed to the first row of modulator elements. The light which hits mirror bars 26 will be reflected back to the first surface, where it will hit an area mirror 28 and be reflected back towards the modulator; exiting beamsplitter/staggerer 24 parallel to the first beam, but even further displaced. The displacement can be tuned by adjusting the tilt angle $\theta_{tilt}$.

For this device to work, the extent of area mirror 28 and the mirror bars 26 must be precisely controlled. The area mirror must extend far enough to pick up the reflected beam, without obstructing the incoming light. Likewise. the mirror bars must extend far enough to reflect the incoming beam back to the first surface, but not so far that the beam reflected from the first surface is obstructed. Area mirror 28 could alternatively also be a mirror bar pattern, with its bars out of phase with the mirror bars on the second surface.

Figure 1A:
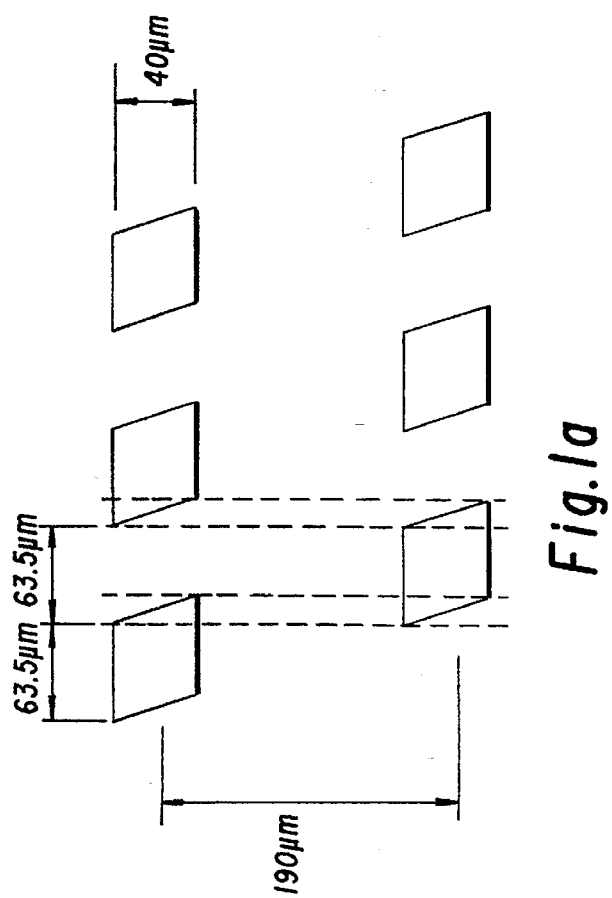
FIG. 1a illustrates the pattern of elements of a commercially-available PLZT shutter array modulator.
Figure 4B:
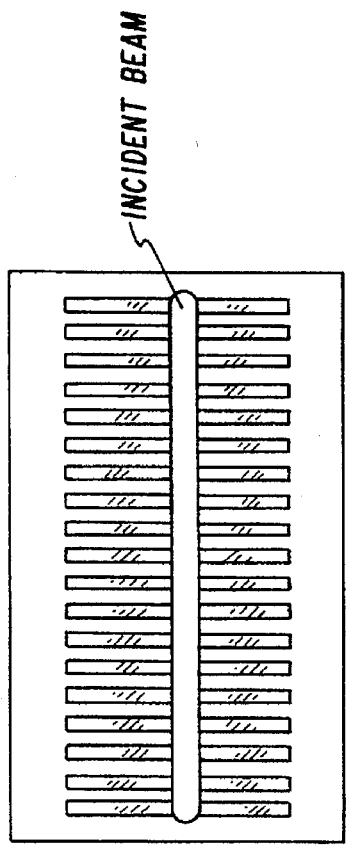
FIG. 4b is a detail illustration similar to FIG. 4a, showing an alternative embodiment.
Figure 4A:
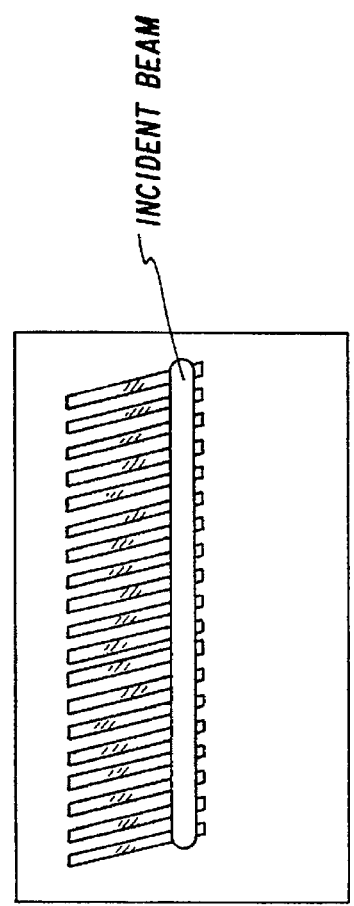
FIG. 4a is a detail illustration of a portion of the beamsplitter/staggerer of FIG. 4.

Mirror bars 26 can be patterned diagonally, as shown in FIG. 4, and in more detail in FIGS. 4a, to be compatible with the modulator element shape of FIG. 1a. For the Minolta modulator, these mirror bars are at an angle of 18.4 degrees relative to the beam. The mirror bars can also be patterned with straight bars, as shown in FIG. 4b, so as to be compatible with the modulator element shape of FIG. 1c. The incident beam in this case (FIG. 4b), would be incident near the end of the mirror bars, not in the middle, as shown.

The mirrors can be made with silver, gold, or dielectric coatings. The remaining non-mirrored portions of the first and second surfaces should be AR coated.

Figure 5:
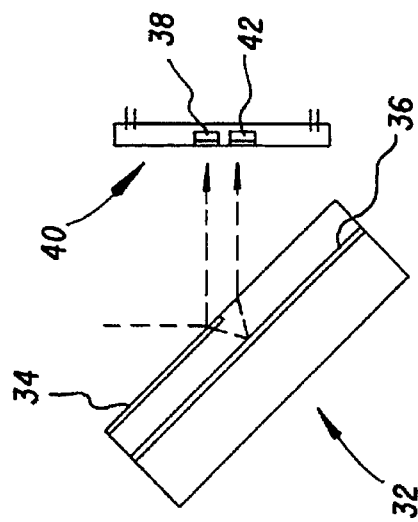
Figure 9B:
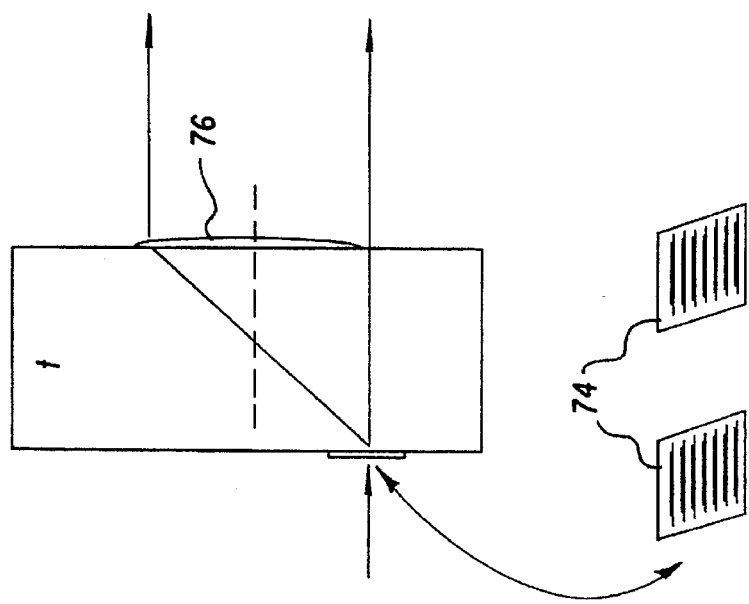
Figure 9A:
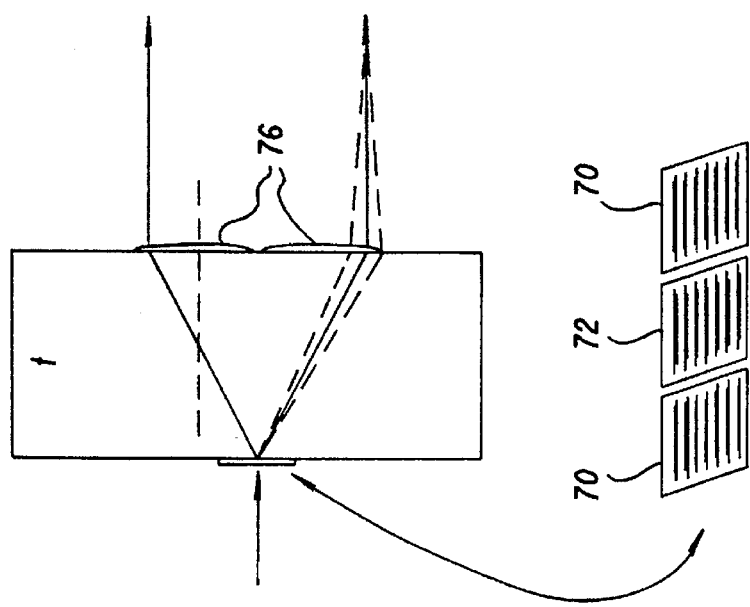

The beamsplitter/staggerer of FIG. 5 could be made of 1.0 mm thick fused silica. For a 810 nm laser, a tilt angle $\theta_{tilt}$ of 8.16 degrees will provide a 190 μm offset for use with the modulator of FIG. 1a. The path length for the two beams is greatly different (by approximately 2 mm). This would have to be compensated for so that the two beams would both focus at the modulator plane. Thus, FIG. 2b shows that the beam path with the shorter path will require a compensator plate 30 in its beam path to account for this difference. This compensator plate could be a separate piece, as shown, or it could be integral with the device. Many of the devices discussed in this specification will require compensator plates, while others will not need compensator plates under the right circumstances (no proximity problem, no aberration problem, minimal light loss). The devices of FIGS. 9a and 9b are designed not need such a plate.

Referring to FIG. 5, a profile view is shown of a reflective (not "in-line") beamsplitter/staggerer 32 which consists of an upper pattern of mirror bars 34 and a lower mirror 36. In this embodiment, light which hits the upper pattern of mirror bars is directed to one row of elements 38 of a modulator 40, while light that hits the lower mirror 36 is directed to a second row of elements 42. In its most straightforward form, light is incident onto the beamsplitter/staggerer at a 45 degree angle. The beamsplitter/staggerer is tilted 45 degrees relative to modulator 40. Light is reflected from the mirror surfaces of the beamsplitter/staggerer and directed onto the modulator at normal incidence. The two parallel mirror planes are offset from each other so as provide the desired offset (190 μm in the illustrative embodiment) at the modulator. The actual offset between the mirror planes depends on the details of the design of the system.

Certainly, other angular combinations of tilt of the mirror planes and incidence onto the mirror planes could be used. The two mirror planes could remain parallel to each other, or alternative systems can be considered where the two mirror planes are not parallel, but are tilted at different angles. This may be less desirable, as the light hitting the modulator elements would no longer be at normal incidence, and the Lagrange, with respect to the printing lens, would be increased.

In its simplest form, mirror bars 34 of the FIG. 5 device would be parallel, oriented laterally perpendicular to the beam, as shown in FIG. 4b. In this case, the incident light could hit anywhere along the bars, as long as mechanical conflict with the modulator is avoided. Such a device would work well for a modulator of the FIG. 1c configuration, with square or rectangular elements.

A reflective beamsplitter/staggerer which is configured for a modulator of the FIG. 1a configuration, with parallelogram elements, must be more sophisticated. As with the FIG. 4 system, it must not only have diagonal mirror bars, but bars which are properly designed to allow the light to the other row of modulator elements to pass by unobstructed. As shown in FIG. 5, the lower mirror 36 extends out beyond the end of the upper mirror bars 34, and the light hitting the upper mirror bars is incident just above the end of the upper mirror bars. Thus, the light can reflect from the surface of lower mirror 36 clear of mirror bars 34 to pass unobstructed to the modulator. Upper mirror bars 34 are undercut to allow the light passing to lower mirror 36 to actually pass beneath the upper mirror bars.

Figure 6:
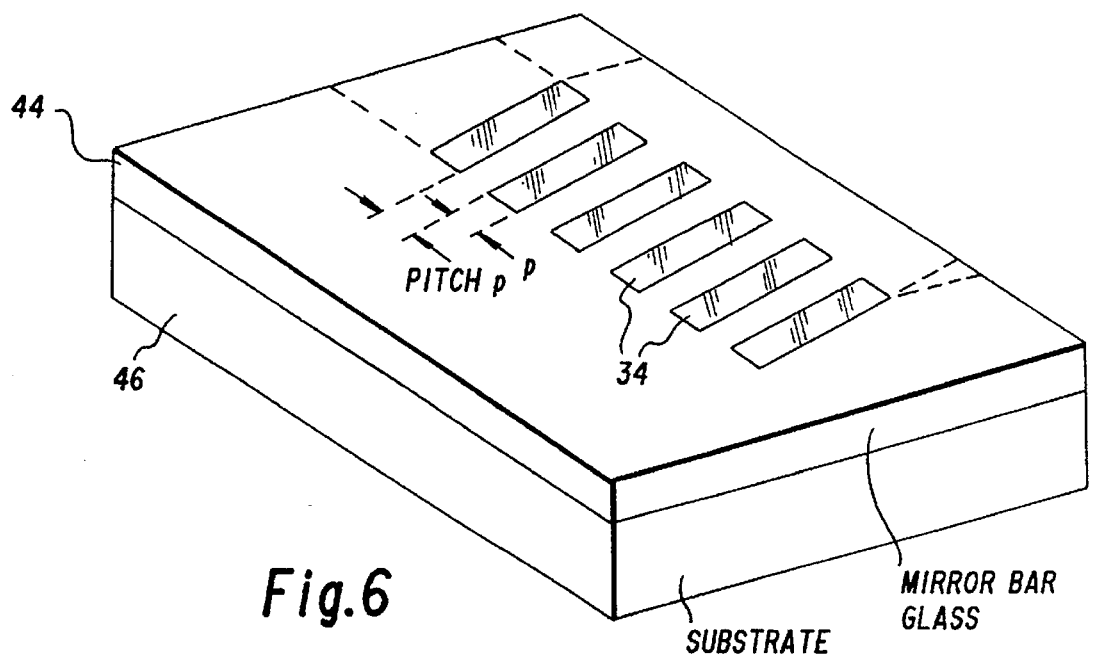
FIG. 6 illustrates a preferred manner of constructing the beamsplitter/staggerer of FIG. 5.

There are several ways in which the beamsplitter/staggerer might be made. FIG. 6 illustrates a version wherein upper mirror bars 34 are patterned coatings on the front face of a mirror bar glass 44. The rest of this front surface is then AR coated. The thickness of mirror bar glass 44 is selected to provide the desired offset between the two beams (190 μm in the illustrative example). For example, for a 810 nm laser incident at 45 degrees, and using BK-7 mirror bar glass with a refractive index of 1.51, mirror bar glass 44 would be approximately 254 μm thick. Mirror bar glass 44 can be bonded to a substrate glass 46 to reduce the fragility of the device. Lower mirror 36 is coated to one of the two pieces of glass at the interface between the two. As with the transmissive device of earlier embodiments of the invention, lower mirror 36 can be either an alternating pattern of bars just out of phase with the bars on upper mirror bars 34 or, more simply, an area coating. This device provides the required undercut by having the light to lower mirror 36 passing through the glass underneath upper mirror bars 34.

Figure 7:
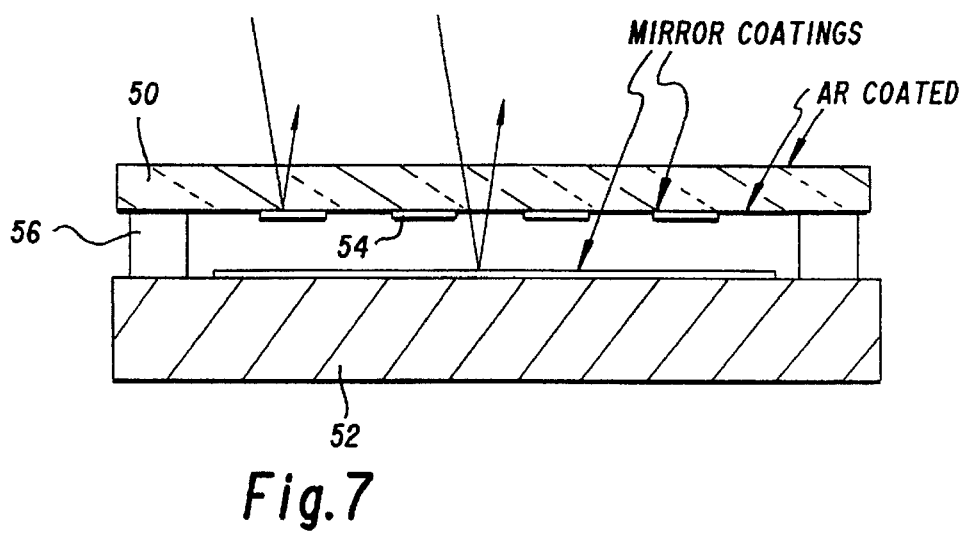

FIG. 7 illustrates another embodiment of the beamsplitter/staggerer wherein a mirror bar glass plate 50 is spaced from a substrate plate 52. A plurality of mirror bars 54 are coated on the inside surface of plate 50, and the airspace (which could be filled with glass or an optical adhesive) between the plates of glass provides the required offset (190 μm in the illustrative embodiment). In this case, the airspace provides the required undercut. The device of FIG. 7 may be better than that of FIG. 6, as it is easier to control the thickness of spacers 56 which separate the plates in FIG. 7, as compared to controlling the thickness of the thin piece of mirror bar glass in FIG. 6.

Figure 8:
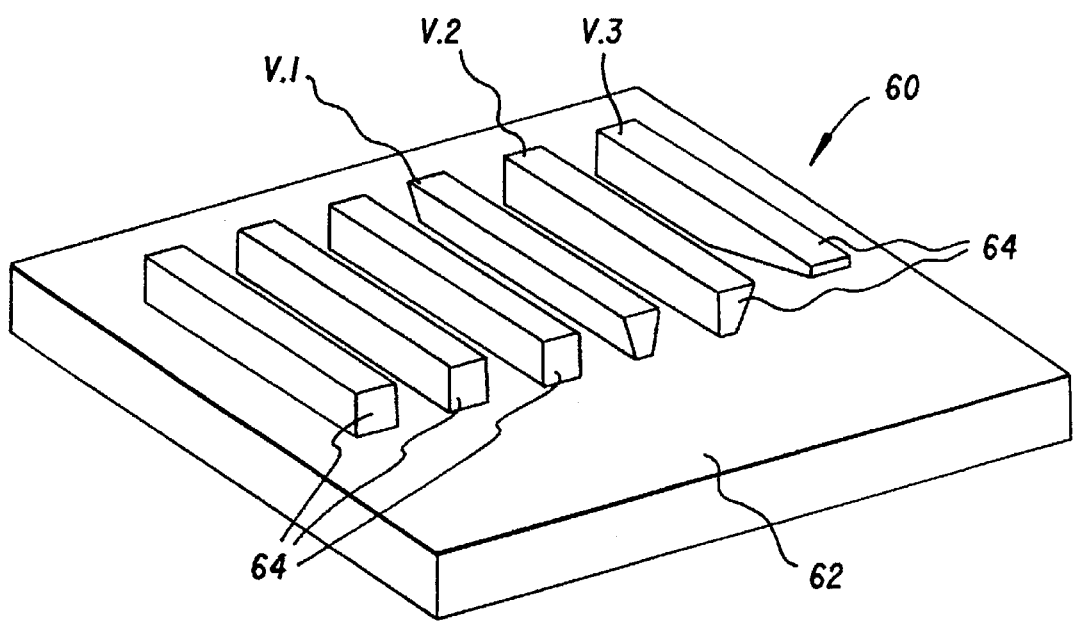

FIG. 8 illustrates yet another alternate version of a beamsplitter/staggerer. In this case, a beamsplitter/staggerer 60 is very much like a phase grating, with the lower level 62 and upper level 64 mirror bars formed by a process that creates a series of grooves. Indeed, this beamsplitter/staggerer could potentially be made by cutting or etching grooves directly into a substrate, and then mirror-coating both levels. Alternately, it could be made by building up a structure from the substrate using a photoresist process. While this structure could accommodate the straight elements of the FIG. 1c device, vignetting from light hitting the sides of the grooves might limit the usefulness for the parallelogram type elements of FIG. 1a. Potentially this problem could be overcome by undercutting the upper level bars, as shown by the V.1, V.2, and V.3 bars of FIG. 8. Photoresist processes do allow for some undercutting. Another potential problem is that the quality of the groove cutting or etching would effect the quality of the lower level mirror bars. This technique does have the advantage that the structure does not have to be assembled from multiple components.

Referring to FIGS. 9a and 9b, splitting and the imaging of the splitting region onto the modulator elements is provided using one integrated part. The channels are split by using blazed gratings. In FIG. 9a, two different grating patterns 70 and 72 are alternately used across the device; while in FIG. 9b, a single grating pattern 74 is used for all gratings across the device, leaving spaces between the gratings. The gratings are shaped like the modulator elements, not shown. These gratings are then imaged by a lens or lenses 76 which have a focal length equal to half the substrate thickness, and which are positioned so that the beams pass through the focus in the glass, and thus are telecentric at the modulator. The lenses can either be diffractive (binary) or refractive. The devices of FIG. 9a have the advantage that the two beams have the same path length, so a compensator isn't needed after the splitter. Furthermore, these devices would be quite small and therefore could be placed in close proximity to the modulator (within approximately 100 μm) to minimize light loss by overfilling the elements.

Figure 10:
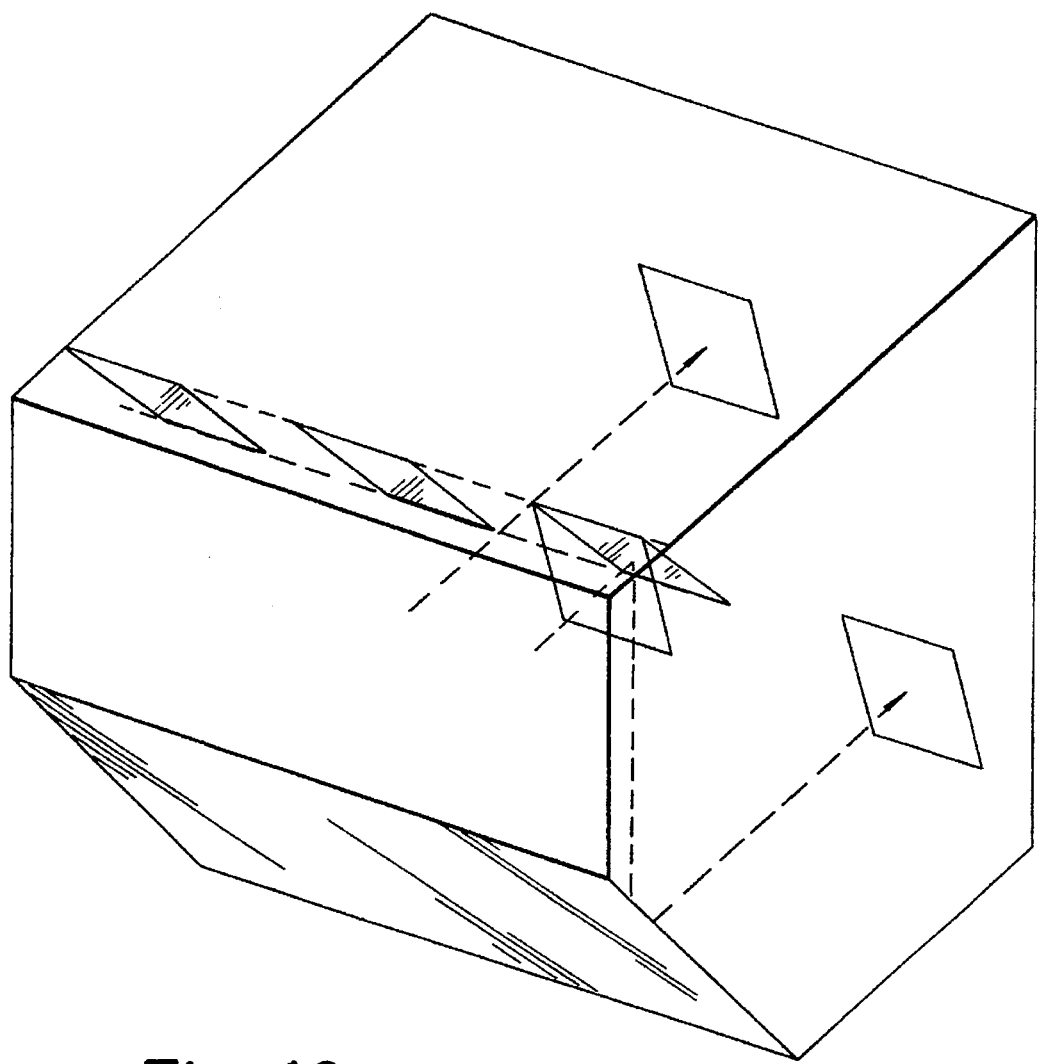

FIG. 10 shows yet another design of a beamsplitter/staggerer according to the present invention. This device is very much like that of FIG. 4, as it uses a patterned set of mirrors to send light to the second channel. The path length difference between the two channels is small enough that the device might be used without a compensator, with only a little light loss occurring from overfilling. Furthermore, this device has a small footprint, which would allow it to be placed in proximity to the modulator.

Beamsplitter/staggerer devices as disclosed herein, in combination with an illumination system which provides a narrow line of laser light, make possible the illumination of a spatial light modulator device which consists of two offset rows of staggered elements. Furthermore, these devices allow the modulator element illumination to be provided in a manner that increases the cross array field of the printing lens that images the light onto the media, without increasing the per-element Lagrange. This increased field is not a problem, as the lens must provide sufficient field in the array direction when working with a linear modulator.

The invention has been described in detail with particular reference to preferred embodiments thereof, but it will be understood that variations and modifications can be effected within the spirit and scope of the invention.

What is claimed is:

1. For use with (1) a multi-element spatial light modulator having plural rows of staggered elements and (2) an illumination system which provides a narrow line of laser light, a beamsplitter/staggerer adapted to split the narrow line of laser light into plural parallel lines of light, and to split each of the parallel lines of light into regions such that substantially all of the light from the illumination system falls onto the elements of the plural rows without impinging between the rows of elements or between the elements in the rows, said beamsplitter/staggerer comprising:

an alternating grating of reflective bars patterned onto a plate with spaces between the bars, the bars being tilted relative to the incident angle of the light such that light reflected by the tilted bars is displaced relative to the light passing through the spaces between the bars; and a mirror surface in the path of light reflected by the tilted bars, the mirror surface (1) being positioned to reflect light toward the modulator and (2) comprising a mirror bar pattern with its bars out of phase with the tilted bars.

2. A beamsplitter/staggerer as set forth in claim 1 wherein the beamsplitter/staggerer is light transmissive.

3. A beamsplitter/staggerer as set forth in claim 2 wherein the beamsplitter/staggerer comprises an alternating array of light-transmissive plates and spaces between the plates, the plates being tilted relative to the incident angle of the light such that light passing through the tilted plates is displaced by refraction relative to light passing through the spaces between the plates.

4. A beamsplitter/staggerer as set forth in claim 1 wherein the reflective bars are patterned diagonally at an angle relative to the incident light beam.

5. A beamsplitter/staggerer as set forth in claim 1 wherein the beamsplitter/staggerer comprises a blazed grating for splitting and imaging the light onto the modulator elements.

6. A beamsplitter/staggerer as set forth in claim 5 wherein the blazed grating comprises a plurality of spaced apart gratings with spaces between the gratings such that light passing through the gratings is displaced relative to light passing through the spaces between the gratings.

7. A beamsplitter/staggerer as set forth in claim 5 wherein the blazed grating comprises an alternating pattern of two different grating patterns such that light passing through one grating pattern is displaced relative to light passing through the other grating pattern.

8. For use with (1) a multi-element spatial light modulator having plural rows of staggered elements and (2) an illumination system which provides a narrow line of laser light, a beamsplitter/staggerer adapted to split the narrow line of laser light into plural parallel lines of light, and to split each of the parallel lines of light into regions such that substantially all of the light from the illumination system falls onto the elements of the plural rows without impinging between the rows of elements or between the elements in the rows, said beamsplitter/staggerer comprising:

an alternating grating of reflective bars patterned onto a plate with spaces between the bars, the bars being tilted relative to the incident angle of the light such that light reflected by the tilted bars is displaced relative to the light passing through the spaces between the bars; and a mirror surface in the path of light passing through the spaces between the bars, the mirror surface (1) being positioned to reflect light toward the modulator and (2) comprising a mirror bar pattern with its bars out of phase with the tilted bars.

9. For use with (1) a multi-element spatial light modulator having plural rows of staggered elements and (2) an illumination system which provides a narrow line of laser light, a beamsplitter/staggerer adapted to split the narrow line of laser light into plural parallel lines of light, and to split each of the parallel lines of light into regions such that substantially all of the light from the illumination system falls onto the elements of the plural rows without impinging between the rows of elements or between the elements in the rows, said beamsplitter/staggerer comprising:

an alternating grating of reflective bars patterned onto a plate with spaces between the bars, the bars being (1) tilted relative to the incident angle of the light such that light reflected by the tilted bars is displaced relative to the light passing through the spaces between the bars and (2) patterned diagonally at an angle relative to the incident light beam, the path length of light reflected by the tilted bars being different from the path length of light passing through the spaces between the bars; and a compensator in one of the path lengths to account for this difference.

* * * * *

UNITED STATES PATENT AND TRADEMARK OFFICE
CERTIFICATE OF CORRECTION

PATENT NO. : 5,646,786
DATED : July 8, 1997
INVENTOR(S) : Andrew F. Kurtz, et al It is certified that error appears in the above-indentified patent and that said Letters Patent is hereby corrected as shown below:

| | |
|---|---|
| Col. 7, claim 1, line 26 | Delete "narrow" |
| Col. 7, claim 1, line 27 | Delete "narrow" |
| Col. 8, claim 8, line 15 | Delete "narrow" |
| Col. 8, claim 8, line 16 | Delete "narrow" |
| Col. 8, claim 9, line 34 | Delete "narrow" |
| Col. 8, claim 9, line 36 | Delete "narrow" |

Signed and Sealed this

Second Day of June, 1998

*Attest:*

BRUCE LEHMAN

*Attesting Officer*  *Commissioner of Patents and Trademarks*